US 6,596,792 B2

(12) United States Patent
Johnson

(10) Patent No.: US 6,596,792 B2
(45) Date of Patent: *Jul. 22, 2003

(54) TRIBOLOGICAL PERFORMANCE OF THERMOPLASTIC COMPOSITES VIA THERMALLY CONDUCTIVE MATERIAL AND OTHER FILLERS AND A PROCESS FOR MAKING THE COMPOSITE AND MOLDED ARTICLES OF THE SAME

(75) Inventor: Kristy J. Johnson, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/846,638

(22) Filed: May 1, 2001

(65) Prior Publication Data

US 2002/0028869 A1 Mar. 7, 2002

Related U.S. Application Data

(60) Continuation of application No. 09/312,430, filed on May 14, 1999, now Pat. No. 6,372,836, which is a division of application No. 09/104,959, filed on Jun. 25, 1998, now Pat. No. 6,191,204.

(51) Int. Cl.⁷ ............................. C08J 5/14; C08K 9/00; C08K 3/08; C08L 77/00; C08L 79/00

(52) U.S. Cl. ........................ 524/80; 523/149; 523/200; 524/439; 524/606

(58) Field of Search .......................... 524/80, 439, 606; 523/149, 200

(56) References Cited

U.S. PATENT DOCUMENTS 5,565,514 A * 10/1996 Carlberg
5,604,285 A * 2/1997 Miyamori et al.
5,971,617 A * 10/1999 Woelki et al.
6,191,204 B1 * 2/2001 Johnson

* cited by examiner

*Primary Examiner*—Patrick D. Niland
(74) *Attorney, Agent, or Firm*—Finnegan & Henderson; Steve M Hanley

(57) ABSTRACT

This thermoplastic composition and process for making articles of the same includes a thermoplastic matrix that includes a resin and filler materials wherein the filler materials includes a combination of fibers, at least one lubricant, and thermally conductive material, for improving tribological performance of thermoplastic materials. In the alternative, a thermally conductive lubricant may be substituted for the combination of the lubricant and the thermally conductive material.

15 Claims, No Drawings

TRIBOLOGICAL PERFORMANCE OF THERMOPLASTIC COMPOSITES VIA THERMALLY CONDUCTIVE MATERIAL AND OTHER FILLERS AND A PROCESS FOR MAKING THE COMPOSITE AND MOLDED ARTICLES OF THE SAME This application is a continuation application of pending U.S. patent application Ser. No. 09/312,430 filed May 14, 1999, now U.S. Pat. No. 6,372,836 which is a divisional application of U.S. patent application Ser. No. 09/104,959 filed Jun. 25, 1998, now issued as U.S. Pat. No. 6,191,204 B1.

TECHNICAL FIELD

This invention relates generally to thermoplastic polymers and, in particular, to improving the tribological performance of thermoplastic polymers via thermally conductive media and other fillers and a process for making the same.

BACKGROUND ART

There has been a need for high performance reinforced plastic compositions having enhanced performance capabilities, from a standpoint of durability and longevity, when exposed to wear mechanisms encountered in a typical tribological environment. Such compositions generally have a unique combination of reinforcement materials incorporated into a plastic material.

Bearing materials comprised of self-lubricating composition material prepared from polymers have become popular in the friction and lubrication field because they are self-lubricating, rust-resistant, light in weight, easy to fabricate, relatively low in cost and very compatible. A large percentage of conventional metal bearing members have been gradually replaced by bearing members made from materials using polymers as a matrix.

An engine driveline is one example of a tribological environment where the use of plastic components for dynamic sealing and bearing applications is well known. In this environment, i.e., where a sealing or bearing interface is involved, the plastic component is exposed to friction, pressure, high temperature and lubricants. One such dynamic plastic component is a thrust washer, which is constantly subjected to a combination of varying levels of speed and load at high temperatures. Typically, a multiple of pressure and relative velocity (P*V) is used as a measure of how rigorous and demanding the application is. For example, a P*V value can range from as low as 50,000 to as high as 1,250,000, the pressure being measured in pounds/square-inch (p.s.i.) and the velocity being measured in feet/minute (f.p.m.). Applications having a P*V greater than 150,000 are generally considered to be very demanding.

When a thrust washer is used in a dynamic bearing application, it eventually fails either due to excessive wear at a given P*V, or high thermal stresses due to poor heat dissipation, e.g., "hot spotting", or sometimes a combination of both. Thus it is very desirable that the thrust washer has a high wear resistance at a given P*V so that it performs as a bearing, that it has good dissipation properties to avoid thermal stresses and that it has good flexibility to provide toughness and perform as a bearing. Thrust washers are typically made from plastics such as polyethersulphone (PES), polyamides (PA), polyaryletherketone (PAEK) and polyphenylenesulphides (PPS), to name a few. It would be advantageous to have a lower cost alternative to the PAEK-based thermoplastic bearing materials currently used in dynamic plastic components, including thrust washers.

Besides thrust washers, there are engine parts that are also exposed to tribological wear mechanisms. Sleeve bearings made from plastic compositions are constantly subjected to a harsh environment due to elevated temperatures encountered in the engine, as well as frictional wear and lubricants. Seal rings made from plastic compositions perform the dual function of a seal and a bearing and thus require a combination of high wear resistance and weld line strength without a significantly high flexural modulus.

It is desirable to have a thermoplastic composition that has excellent wear resistance and weld line strength properties without a significant increase in the flexural modulus. In addition, it would be desirable to have such a thermoplastic composition that is relatively insensitive to increases in load, has a medium for maintaining its temperature below its glass transition temperature, and exhibits excellent chemical resistance.

Furthermore, it is desirable to have a thermoplastic composition with the above qualities that is available at a lower price than comparable thermoplastic bearing materials currently on the market.

The present invention is directed to overcoming one or more of the problems set forth above.

DISCLOSURE OF THE INVENTION

In one aspect of this invention, a thermoplastic composition is disclosed. This thermoplastic composition includes a thermoplastic matrix that includes a resin and filler materials wherein the filler materials includes a combination of fibers, at least one lubricant, and thermally conductive material, for improving tribological performance of thermoplastic materials. In the alternative, a thermally conductive lubricant may be substituted for the combination of the lubricant and the thermally conductive material.

In another aspect of the present invention, a process for forming a product that functions in a tribological environment that includes the steps of compounding and molding a thermoplastic composition including a thermoplastic matrix that includes a resin and filler materials wherein the filler materials includes a combination of fibers, at least one lubricant, and thermally conductive material, for improved tribological performance of thermoplastic materials at lower cost. In an alternative, a thermally conductive lubricant may be substituted for the combination of the lubricant and the thermally conductive material.

BRIEF DESCRIPTION OF THE DRAWINGS

For a better understanding of the present invention, reference may be made to the accompanying drawings in which:

FIG. 1 is a graph illustrating the torque response of a preferred embodiment of the present invention during high speed, low load P*V testing conditions;

FIG. 2 is a graph illustrating the temperature response of the preferred embodiment during high speed, low load P*V testing conditions;

FIG. 3 is a graph illustrating the wear test results of the preferred embodiment during high speed, low load P*V testing conditions;

FIG. 4 is a graph illustrating the volumetric wear rate for the preferred embodiment at various system temperatures;

FIG. 5 is a graph illustrating wear test results for the preferred embodiment and a known sample composite aged in 120° C. transmission oil for 4,000 hours;

FIG. 6 is a graph illustrating wear test results for the preferred embodiment and a known sample composite aged in 120° C. air for 4,000 hours;

FIG. 7 is a graph illustrating wear test results for the preferred embodiment and a known sample composite aged in 20° C. kerosene for 2,000 hours;

FIG. 8 is a graph illustrating wear test results for the preferred embodiment and a known sample composite aged in 20° C. water for 100 hours;

FIG. 9 is a graph illustrating a comparison of the tensile strength and tensile elongation of the preferred embodiment and a known sample composite;

FIG. 10 is a graph illustrating a comparison of the flexural strength and flexural modulus of the preferred embodiment and a known sample composite;

FIG. 11 is a graph illustrating the preferred embodiment's retention of tensile strength and tensile elongation after aging in 120° C. transmission fluid for 2000 hours;

FIG. 12 is a graph illustrating the preferred embodiment's retention of tensile strength and tensile elongation after aging in 120° C. air for 4,000 hours;

FIG. 13 is a graph illustrating the preferred embodiment's retention of tensile strength and tensile elongation after aging in 20° C. water for 500 hours;

FIG. 14 is a graph illustrating the preferred embodiment's retention of tensile strength and tensile elongation after aging in 20° C. kerosene for 500 hours;

FIG. 15 is a graph illustrating the preferred embodiment's retention of flexural strength and flexural modulus after aging in 120° C. transmission fluid for 2,000 hours;

FIG. 16 is a graph illustrating the preferred embodiment's retention of flexural strength and flexural modulus after aging in 120° C. air for 4,000 hours;

FIG. 17 is a graph illustrating the preferred embodiment's retention of flexural strength and flexural modulus after aging in 20° C. water for 500 hours; and FIG. 18 is a graph illustrating the preferred embodiment's retention of flexural strength and flexural modulus after aging in 20° C. kerosene for 500 hours.

BEST MODE FOR CARRYING OUT THE INVENTION

In the preferred embodiment of the present invention, a combination of fibers, at least one lubricant, and thermally conductive material is incorporated into a thermoplastic matrix, resulting in a reinforced thermoplastic composition material for forming molded and extruded products that function in a tribological environment. A thermally conductive lubricant can be substituted for the combination of at least one lubricant and thermally conductive material.

The thermoplastic matrix that holds the solid lubricants and reinforced fibers includes a resin. This resin is preferably semi-crystalline. The thermoplastic composition has a glass transition temperature that typically, but not necessarily, exceeds a bulk system temperature of the surfaces of mating components in a tribological environment, in the absence of frictional heating. Preferably, the glass transition temperature is at least 70° C., advantageously over 90° C., and preferably about 125° C.

One suitable base resin material is a thermoplastic copolymer of an aliphatic-aromatic polyamide and a terephthalic aromatic chain having a trade name "Zytel HTN FE8200." Zytel HTN FE8200 is a semi-crystalline engineering resin manufactured by E. I. du Pont de Nemours and Company, which has its corporate headquarters at 1007 Market Street, Wilmington, Del. 19898. In addition, Zytel HTN FE8200 has a glass transition temperature of 125° C. and a melting point of 300° C. Zytel HTN FE8200 also has a higher melting point, a higher glass transition temperature, and a higher tensile strength than many other polyamide resins or higher performance polymers. Furthermore, Zytel HTN FE8200 is a member of the nylon family. Nylons display a low coefficient of friction when they contact many other materials. Also, when used within their P*V limitations, nylons have good resistance to wear. It is well known in the art that this base resin can be filled with long glass reinforcement for use in high temperature and structural applications. However, the preferred embodiment advantageously uses non-glass-filled Zytel HTN FE8200 as the matrix for a bearing material.

The base resin material present in the thermoplastic composition preferably comprises from about 50% to about 95% by weight of the thermoplastic composition with the optimal value being about 75%.

The thermoplastic matrix may also be comprised of the base resin of polyphthalamide. For example, polyphthalamide is a semi-crystalline resin that has a glass transition temperature of 105° C. and a melting point of 310° C. Grades of polyphthalamide provide significantly improved toughness comparable to other polymers and retain much higher strength and stiffness across a broad humidity and temperature range.

Yet another base resin material that the thermoplastic matrix may include is polyphenylene sulfide. Polyphenylene sulfide is a specialty engineering plastic recognized for its unique combination of properties, including thermal stability and chemical resistance. Polyphenylene sulfide has a glass transition temperature of 85° C. and a melting point of 285° C.

Other resins with relatively high glass transition temperatures may also be used for the thermoplastic matrix. Any resin, however, must have at least a glass transition temperature that exceeds a bulk system temperature of the surrounding tribological environment. For example, Nylon 4, 6, which has a glass transition temperature of 82° C., and liquid crystal polymers are two additional base resins which the thermoplastic matrix may comprise.

The filler material contained in the thermoplastic matrix can include a combination of fibers, to impart an optimum combination of desirable properties such as wear resistance and compressive strength without significant increase in flexural modulus, and lubricants to impart the required amounts of lubricity to the thermoplastic.

In a preferred embodiment of the present invention, the fiber used in the filler material is milled glass fiber. Using milled glass fiber is advantageous because it conveniently has many exposed fiber ends and a small percentage of milled glass fiber imparts a significant amount of wear resistance. Milled glass fiber also advantageously serves to moderately "machine" a mating surface.

The milled glass fiber used to carry out a preferred embodiment of the present invention has the trade name Fiberglas® brand milled fibers 497DB and is manufactured by Owens Corning, that has its headquarters located at One Owens Corning Parkway, Toledo, Ohio 43659.

Fibers are present in the thermoplastic matrix, preferably comprising in a range from about 0% to about 35% of the thermoplastic composition with the most preferred value being 5%. Furthermore, the fibers have a length desirably in the range from about 50 to about 2500 micrometers, a diameter in the range from about 50 to about 200 micrometers, and a length to diameter ratio of about 1:20.

Numerous other fibers or fiber-like substances may be utilized, including but not limited to, glass, aramid, carbon, and ceramic.

Certain lubricants are advantageously added to the thermoplastic matrix of the embodiment to impact the required amount of lubricity to the composition. Some preferred lubricants include polytetrafluoroethylene, silicone resin modifier, and metallic particles. The preferred type of metallic particles are bronze flakes.

Polytetrafluoroethylene advantageously imparts lubricity to the thermoplastic composition and is present in the thermoplastic matrix, preferably comprising in a range from about 0% to about 20% by weight of the thermoplastic composition, with the most preferred value being 5%. The polytetrafluoroethylene used in carrying out a preferred embodiment has the trade name WHITCOM PTFE TL-5, is manufactured by ICI Fluropolymers and is well known in the art as a common ingredient in self-lubricated thermoplastic bearing compositions. ICI has an address at 1300 Connecticut Avenue NW., Suite 901, Washington D.C. 20036.

Silicone resin modifiers are known as a processing aid to be used with low temperature resins. However, a preferred embodiment of the present invention advantageously utilizes an unusually higher percentage of silicone resin modifier as a composition bearing additive. Silicone resin modifier conveniently imparts lubricity, aids in processing, and gives the thermoplastic flame retardance. A preferred silicone resin modifier has the trade name Silicone Resin Modifier 4-7051, is manufactured by Dow Corning, located at 2200 W. Salzburg Road, Midland Mich. 48686, and is present in the thermoplastic matrix, preferably comprising from about 0% to about 20% by weight of the thermoplastic composition, with the most preferred value being 5%.

Metallic particles are known for use in sinterable fluoropolymer compositions as a thermally conductive agent. A preferred embodiment of the present invention synergistically uses bronze flakes to channel heat generated at the interface through the bearing and also to impart lubricity. The bronze flake used to carry out a preferred embodiment has a trade name Bronze Flake 9020, is manufactured by Reade Advanced Materials. Reade Advanced Materials has an address at Post Office Drawer 15039, Riverside, R.I. 02915-0039. Metallic particles are present in the thermoplastic matrix, preferably comprising in a range from about 2% to about 30% by weight of the thermoplastic composition, with the most preferred value being 10%. The size of the metallic particles can range from 0.01 micrometers to about 50 micrometers with the optimal size of around 12.57 micrometers.

Tribological performance data for the thermoplastic composition bearing material of a preferred embodiment of the present invention is shown in FIGS. 1 and 2. FIG. 1 shows the torque response for the embodiment. The P*V is varied by changing the speed and load inputs. The approximate P*V levels for each step are shown at the bottom of the graph, ranging from 100,000 p.s.i.*f.p.m. to 300,000 p.s.i.*f.p.m. Input speed and load, are denoted as high, medium, and low. The resultant torque reading for the system is shown by a star for known samples and by a circle for the preferred embodiment of the present invention.

FIG. 1 shows that the present invention is much more insensitive to increases in load than the known samples. Furthermore, even as the lubricant film is squeezed out at higher loads, the lubricity of the composition does not allow a significant increase in the coefficient of friction.

FIG. 2 shows the temperature response of the thermoplastic composition. Input speed and load, denoted by high, medium, and low are listed along the x-axis. The resultant average interfacial temperature reading for the system is shown by a star for a known sample and by a circle for the preferred embodiment of the present invention. Also, as shown in FIG. 2, the average interfacial temperature remains below 120° C. because there is no appreciable increase in the coefficient of friction. However, even if the coefficient of friction were to rise at high loads, higher than that shown in FIG. 2, the thermal conductivity of the resin would advantageously help function as a means to channel the heat away from the interface and delay the onset of accelerated wear.

In a test where the splash lubricant was removed and the load was continually increased, the interface temperature of a PAEK-based thermoplastic bearing material increased past its glass transition temperature and caused failure within twenty-four minutes. However, under the same conditions, a preferred embodiment of the present invention lasted for almost two hours before system failure. This demonstrates the superior performance of the present invention.

Testing was also conducted to determine the P*V capability of a preferred embodiment at a constant speed of 1800 rpm, while continually increasing load. This test showed that the PAEK-based bearing material exhibited catastrophic interface temperatures at a pressure of 300 p.s.i., resulting in a P*V limit of 336,000 p.s.i.*f.p.m. under these conditions. The preferred embodiment tested showed no appreciable increase in interface temperature up to a pressure of 500 p.s.i., (the limit of the test) resulting in a P*V capability of at least 560,000 p.s.i.*f.p.m. under the conditions tested. This confirms the superior performance of the preferred embodiment.

Wear tests were also conducted to determine the wear resistance of a preferred embodiment of the present invention. FIG. 3 shows a comparison of the embodiment's wear depth, compared to that of other more expensive plastic bearing materials after a 100 hour wear test conducted at a p*v of 205,000 p.s.i.*f.p.m. under splash lubricated conditions. As shown on FIG. 3, the wear test shows that the preferred embodiment meets the pre-set requirement that it performs at least as well as other, more expensive transmission thrust washer materials, with the sole exception of a composition formed of a self-lubricated, PAEK-based thermoplastic bearing material. However, the performance of the preferred embodiment is nearly as good as that of that of the self-lubricated, PAEK-based thermoplastic bearing material.

The preferred embodiment of the present invention is also lubricious enough to prevent detrimental frictional heat in lubricated tribological contacts at normal system temperatures in the range of 70° C. to 100° C. However, because heat may evolve in a transmission from an external source, testing was conducted to determine the tribological response at excessive system temperatures. Upon completion of a test run at a system temperature of 132° C., the known sample composition showed catastrophic failure due to melting at a P*V level in the range from about 392,000 to about 448,000 p.s.i.*f.p.m. The preferred embodiment tested under the same conditions, does not show any signs of melting. Furthermore, the wear depth for the sample thrust washer comprised of the preferred embodiment had a wear depth of only 0.017 millimeters.

Additional testing was performed by exposing a washer made from a preferred embodiment of the present invention to a 132° C. oil delivery temperature at 205,000 P*V for 100 hours. The resulting wear rate of 0.00263 cubic centimeters per hour (cm$^3$/hr) indicates that the sample could run for over 800 hours at these conditions. The volumetric wear rate for the present invention at various system temperatures is shown in FIG. 4.

For a preferred embodiment of the present invention having a nylon-based copolymer base resin, testing was necessary to evaluate the potential effect of aging on physical and tribological properties. A typical example of a tribological component is, but is not limited to, a transmission thrust washer. A transmission thrust washer is commonly exposed to hot air and transmission oil, and could also be exposed to water and kerosene. Therefore, testing was conducted to see how the nylon-based copolymer would perform when exposed to these conditions over time. Tribological results from a 4,000 hour aging test, comparing the wear of the embodiment to the wear of the known sample composition, are shown in FIGS. 5–8.

FIG. 5 shows the wear test results for samples of a preferred embodiment of the present invention aged in 120° C. transmission oil for 4,000 hours. FIG. 6 shows the wear test results for samples aged in 120° C. air for 4000 hours. FIG. 7 shows the wear test results for samples aged in 20° C. Kerosene for 2,000 hours. FIG. 8 shows the wear test results for samples aged in 20° C. water for 100 hours. The results from the tests, as reflected in FIGS. 5–8, demonstrate the preferred embodiment's excellent chemical resistance and its superior performance over time, when subjected to adverse operating conditions.

The preferred embodiment of the present invention also exhibits superior weld line strength. Weld line strength can be described as a measure of the flexural strength of a thrust washer across its weld line. It is often expressed as a percent of parent material and designated as weld line strength retention. The preferred embodiment of the present invention exhibits a weld line strength retention of over 90%, which is considered excellent. Weld line strength is important because if the washer were to break in a transmission, it would be much more likely to fall from the gear-carrier interface and cause excessive wear between the gear and the carrier as well as other transmission problems.

The physical properties for bearing materials used in thrust washers need to be of adequate strength to support the compressive loading on the washers and to withstand the minimum flexing due to a wavy mating surface. FIG. 9 compares the tensile strength and tensile elongation of a preferred embodiment of the present invention with that of the known sample composition. FIG. 10 compares the flexural strength and flexural modulus of the preferred embodiment with that of the known sample composition. Those skilled in the art can see from FIGS. 9 and 10 that the preferred embodiment's tensile strength and flexural strength are more than adequate for most bearing applications.

It is well known in the art that aging samples and noting their physical property retention after their exposure to particular fluids over time is beneficial. Normally, if physical properties are retained at levels of 90% or better, the material's resistance to chemical attack under those conditions would be considered excellent. A preferred embodiment of the present invention was tested by aging in hot transmission oil, hot air, kerosene and water for up to 4,000 hours.

The tensile properties of a preferred embodiment of the present invention at various time intervals are shown in FIGS. 11–14. FIG. 11 is a graph illustrating the preferred embodiment's retention of tensile strength and tensile elongation after aging in 120° C. transmission fluid for 2000 hours. FIG. 12 is a graph illustrating the preferred embodiment's retention of tensile strength and tensile elongation after aging in 120° C. air for 4,000 hours. FIG. 13 is a graph illustrating the preferred embodiment's retention of tensile strength and tensile elongation after aging in 20° C. water for 500 hours. FIG. 14 is a graph illustrating the preferred embodiment's retention of tensile strength and tensile elongation after aging in 20° C. kerosene for 500 hours. As seen in FIGS. 11–14, the preferred embodiment showed excellent chemical resistance under these conditions, retaining its tensile properties at a level above 90% under each of the testing conditions.

The flexural properties of a preferred embodiment at various time intervals are shown in FIGS. 15–18. FIG. 15 is a graph illustrating the retention of flexural strength and flexural modulus after aging in 120° C. transmission fluid for 2,000 hours. FIG. 16 is a graph illustrating the retention of flexural strength and flexural modulus after aging in 120° C. air for 4,000 hours. FIG. 17 is a graph illustrating the retention of flexural strength and flexural modulus after aging in 20° C. water for 500 hours. FIG. 18 is a graph illustrating the retention of flexural strength and flexural modulus after aging in 20° C. kerosene for 500 hours. Under each testing condition, all flexural properties were maintained at levels above 90%, with one exception. When exposed to 120° C. air for 4000 hours, the preferred embodiment of the present invention showed only a 70% retention of its flexural strength. This, in combination with the sample's failure mode, indicates that the material was becoming slightly more brittle. It is unlikely that the material would become more brittle upon further exposure to hot air. Furthermore, the flexural property retention was still in an acceptable range, as thrust washers do not see much flex in their application and the tribological properties of the present invention do not catastrophically worsen under these conditions.

INDUSTRIAL APPLICABILITY

The present invention is a thermoplastic composition that is advantageously applicable in a tribological environment. The thermoplastic composition according to the present invention can be useful in a variety of applications where a combination of wear resistance and weld line strength is desirable without a significant increase in the flexural modulus. Furthermore, the present embodiment is useful for high performance plastic components in applications where a sealing or bearing interface is involved and where the plastic component is exposed to friction, pressure, high temperature and lubricants. Thus, the present embodiment is particularly useful for making thrust washers, pump seals, sleeve bearings and other dynamic bearing and sealing components for engines and transmissions.

Also, the raw material cost of the preferred embodiment of the present invention is significantly lower than the raw material cost of the thermoplastic bearing materials well known in the art for similar and identical applications.

The following description is only for the purposes of illustration and is not intended to limit the present invention as such. It will be recognizable, by those skilled in the art, that the present invention is suitable for a plurality of other applications.

In view of the foregoing, it is readily apparent that the subject thermoplastic composition provides a superior and cost-effective material that very effectively functions within a tribological environment.

Other aspects, objects and advantages of the present invention can be obtained from a study of the drawings, the disclosure and the appended claims.

What is claimed is:

1. A thermoplastic composition, comprising a thermoplastic matrix that includes a polymer resin having a glass transition temperature above 70° C. and selected filler materials wherein said filler materials include a combination of fibers, a lubricant including silicone resin modifier, and a lubricity enhancing thermally conductive material for improving tribological performance of thermoplastic materials.

2. The thermoplastic composition according to claim 1, wherein said polymer resin is selected from the group consisting of a polyamide, polyphthalamide, polyphenylene sulfide, Nylon 4,6 and liquid crystal polymers.

3. The thermoplastic composition according to claim 1, wherein said resin has a glass transition temperature above 100° C.

4. The thermoplastic composition according to claim 1, wherein said resin is semi-crystalline.

5. The thermoplastic composition according to claim 4, wherein said semi-crystalline resin is in a range from about 50% to about 95% by weight of the thermoplastic composition.

6. The thermoplastic composition according to claim 1, wherein said lubricant includes polytetrafluoroethylene.

7. The thermoplastic composition according to claim 1, wherein said thermally conductive material includes metallic particles.

8. The thermoplastic composition according to claim 7, said metallic particles include bronze flakes.

9. The thermoplastic composition according to claim 6, wherein said polytetrafluoroethylene is in a range from about 1% to about 20% by weight of the thermoplastic composition.

10. The thermoplastic composition according to claim 1, wherein said silicone resin modifier is in a range from about 1% to about 20% by weight of the thermoplastic composition.

11. The thermoplastic composition according to claim 7, wherein said metallic particles are in a range from about 2% to about 30% by weight of the thermoplastic composition.

12. The thermoplastic composition according to claim 11, wherein each of said metallic particles range in size from about 0.01 micrometers to about 50 micrometers.

13. The thermoplastic composition according to claim 1, wherein said fibers are selected from a group that includes glass, aramid, carbon, and ceramic.

14. The thermoplastic composition according to claim 1, wherein said fibers are in a range from about 1% to about 35% by weight of the thermoplastic composition.

15. The thermoplastic composition according to claim 1, wherein said fibers each have a length in a range from about 50 micrometers to about 2500 micrometers, a diameter in a range from about 50 micrometers to about 200 micrometers.

* * * * *